United States Patent Office 3,427,269
Patented Feb. 11, 1969

3,427,269
ADHESIVE COMPOSITIONS COMPRISING CERTAIN BLOCK COPOLYMERS AND SELECTED RESINS
Frank C. Davis, Orinda, and William B. Luther and Donald L. Martinson, Long Beach, Calif., assignors to Shell Oil Company, New York, N.Y., a corporation of Delaware
No Drawing. Filed Apr. 22, 1966, Ser. No. 544,374
U.S. Cl. 260—27                                                          6 Claims
Int. Cl. C09j 3/26, 3/14; C08f 43/02

ABSTRACT OF THE DISCLOSURE

Contact adhesive compositions which are essentially dry to the touch at ambient temperatures are provided comprising certain block copolymers in combination with coumarone-indene resins and a rosin based resin in critically defined proportions.

This invention is concerned with new compositions of matter, particularly superior for contact adhesives and heat activated adhesive compositions.

Adhesive compositions of a wide variety are marketed commercially and are being developed. For the most part, these depend on elastomers such as chlorinated rubbers and the like which are either expensive or entail certain special handling procedures and have a number of undesirable physical limitations. It is necessary with the ordinary rubbers to either leave them in the unvulcanized state or to incorporate vulcanizing agents in the formulation and subject the adhesive, after its application, to a vulcanizing treatment. It is obvious that such a step as this is undesirable if by a change in the formulation it can be avoided. On the other hand, with the ordinary rubbers maximum physical properties are not attained unless vulcanizing is actually carried out. For many purposes it is essential that the maximum in physical properties be achieved if the adhesive is to perform its maximum function.

Several types of situations are contemplated here, especially situations requiring a contact adhesive and, secondly, situations requiring an adhesive which may be self-adherent but which is dry to the touch and capable of being "activated" either by contact with a like adhesive layer or by the application of mild heat. Contact adhesives are useful in a wide variety of situations ranging from envelope adhesives to the sealing of decorative laminates such as a plastic shelf covering to the shelf base, attachment of plastic table and counter tops, and like situations. Another illustration is in the construction industry wherein tile is to be applied to a wall, ceiling or floor surface.

The "heat activated" type of adhesive is utilized, for example, in the manufacture of footwear. It is the custom in this industry to use certain established procedures since major alterations from them usually entails large capital expenditures. One of the types of soling employed in this industry is referred to as slab soling. In this case, it is the practice to paint the slab stock with a cement composition of the adhesive, allow the solvent to evaporate, cut the stock into suitable shapes, such as a sole, and thereafter pass the sole coated with the dried adhesive under a heat element to "activate" the adhesive and then adhere the upper to the activated adhesive surface. It is desired for this particular type of process that the adhesive composition be activated at relatively low temperatures, even at room temperature or only slightly above and further that the adhesive prior to activation be relatively "dry" so that dust and dirt do not settle and adhere to the surface and so that the adhesive-coated slab stock sheets may be stacked or stored at least on a temporary basis.

It is an object of the present invention to provide improved adhesive compositions. It is a special object of the invention to provide adhesive compositions which do not require the use of vulcanizing agents or vulcanizing processes. It is a further object of the invention to provide adhesive compositions which are essentially dry to the touch at room temperatures in the absence of volatile carriers therefor. Other objects will become apparent during the following detailed description of the invention.

Now, in accordance with the present invention, improved adhesive compositions are provided wherein the elastomeric component thereof is a block copolymer of the group consisting of polymers having the general configuration

A—B—A wherein each A is a poly(vinyl arene) block and B is a poly(conjugated diene) block, as well as hydrogenated derivatives of such block copolymers, the adhesive compositions also containing a critical combination of two types of resins. One of these, which may be referred to as "Resin A" and particularly coumarone-indene resins, is used in conjunction with a rosin-based resin.

The following composition summarizes the classes of materials together with their proportions.

Table I

| Component: | Parts by weight |
|---|---|
| Block copolymer | 100 |
| Rosin-based resin | 10–50 |
| Resin A | 25–100 |
| Oil | 0–50 |
| Filler | 0–25 |
| Solvent | 0–800 |

Each of these copolymer and resin components has been found to be essential in promoting the optimum combination of properties which is required of a satisfactory adhesive which is dry to the touch and yet which is suitable for use as a contact adhesive or a heat activated adhesive. It has been found that if a rosin-based resin is the only resin employed certain undesirable results are obtained. For example, the peel strength of the adhesive from a substrate is extremely sensitive to the presence or absence of any residual small amounts of solvent. Furtheremore, if utilized in more than very limited proportions, the rosin-based resin results in an adhesive composition of the pressure sensitive type, namely, one which is permanently tacky when employed in conjunction with the subject block copolymers. While such adhesives are certainly of use where permanent tack is desired, such is not the case here where a "dry" adhesive is the objective. On the other hand, if a resin of the coumarone-indene type is utilized as the sole resin in the composition, then the compositions have relatively poor bonding characteristics unsuitable for adhesive composition purposes.

The block copolymers forming the important elastomeric component of the present composition have the general configuration

A—B—A

If the copolymer is not hydrogenated, the blocks A comprise poly(vinyl arene) blocks while the block B is a poly(conjugated diene) block. The blocks A normally have average molecular weights, determined by osmotic molecular weight methods as they are related to intrinsic viscosity, of between about 8,000 and 45,000 (preferably 12–25,000), while the conjugated diene polymer block has average molecular weights between about 35,000 and 150,000 (preferably 40–75,000). Preferably, the blocks A comprise 15–50% by weight of the copolymer, and usually will comprise 20–45% thereof. If the copolymers are hydrogenated, the molecular weight ranges remain in about the same ranges. Two preferred species of such block copolymers include those having the block configuration polystyrene - polybutadiene - polystyrene and polystyrene-polyisoprene-polystyrene as well as their hydrogenated counterparts. The hydrogenated counterpart of the second of the above defined block copolymers is of special interest, not only because of its high stability but because of the elastomeric nature of the hydrogenated mid-section which resembles that of an ethylene-propylene rubber, while the end blocks either remain as poly(vinyl arene) blocks or, if hydrogenated, become saturated blocks typified by vinyl cyclohexane polymer blocks. Thus, the fully hydrogenated preferred species has the block configuration polyvinylcyclohexane-[ethylene - propylene copolymer]-polyvinylcyclohexane.

These particular block copolymers have the unique feature of attaining stress-strain properties of an elastomer without the requirement that it be subjected to curing or vulcanization. Thus, they are sharply differentiated from other rubbers such as natural rubber, polybutadiene, SBR and the like, all which require vulcanization in order to attain satisfactory stress-strain properties.

The term "rosin-based resin" is meant to include the general class of resins derived from rosin as indicated in the following list:

TABLE II

Rosin-based resins:
  Wood rosin
  Polymerized rosin
  Hydrogenated rosin
  Disproportionated rosin
  Dimerized rosin
  Pentaerythritol esters of rosin
  Pentaerythritol esters of hydrogenated rosin
  Pentaerythritol esters of polymerized rosin
  Glycerol esters of rosin
  Glycerol esters of hydrogenated rosin
  Methyl esters of hydrogenated rosin The term "hydrogenated rosins" in the above list includes both fully and partially hydrogenated rosins. The polymerized rosins may be of any of the usual commercially available stages of polymerization. In most cases, since the adhesive is not exposed to view except prior to its use, color is not of primary importance but, if the competitive pricing will permit light colored products are desirable such as are obtained by the better grades of rosin and hydrogenated rosins. Polymerized rosin and pentaerythritol esters of hydrogenated rosin are the most preferred categories of the rosin-based resins.

The "Resin A" includes especially those listed in Table III below:

TABLE III

Resin A:
  Coumarone-indene resins (preferably, M.P.=75–150° C.)
  Polymerized aliphatic and alicyclic petroleum hydrocarbons
  Coal tar resins
  Phenol-modified coumarone-indene resins The coumarone-indene resins are especially preferred for this type of resin. The two classes of resins utilized in this specification are concerned with their relationship to the block copolymers. Their behavior cannot necessarily be readily predicted by their corresponding behavior with other types of polymers or even with other types of elastomers, since the block copolymers of the present invention constitute a very special class of elastomers. The rosin-based resins being more or less incompatible with the block copolymer, when used as the sole resin with the block copolymers result in a sticky composition characteristic of a pressure sensitive adhesive. Resin A on the other hand being more compatible with the copolymer, when combined with the block copolymer in the absence of resins of the rosin-base type, act more or less as an extender, provide compositions deficient in adhesive tack and do not provide adhesive compositions without modification according to the present invention.

It will be noted according to Table I that the proportion of rosin-based resin is maintained at the lowest level possible to take advantage of the tack provided by the resin without degrading the tensile strength of the compositions concerend. On the other hand, according to Table I, the proportion of the coumarone-indene resin is kept as high as possible within the framework of the contact or heat activated adhesive requirements so as to obtain the maximum benefit of the tensile strength considerations referred to above.

The compositions of the invention may function satisfactorily without any mineral oil extender but it has been found that oil functions in an unexpected manner not only to plasticize, soften and tackify the composition but also to create a consistency especially suitable for rapid escape of the volatile solvent utilized for viscosity purposes. On the other hand, the proportion of oil which may be incorporated is strictly limited, since if proportions in excess of 50 phr. (parts by weight per hundred parts by weight of block copolymer), then poor adhesion to the surfaces being sealed results.

The type of mineral oil utilized for this purpose is not especially critical but should be one which does not volatilize under the conditions of service. Consequently, it is preferred that it have a boiling point above about 550° F. and a viscosity between about 40 and 250 SSU at 210° F. Such oils are often referred to as "processing and rubber extending oils" and preferably have aromatic contents varying from about 10% to about 50%, the balance of the oil being naphthenic or paraffinic.

One of the means for reducing the cost of compositions which must be competitively priced is by the addition of inert fillers. However, for the present purpose, it is essential to keep the proportion of any fillers which may be present to no more than 25 parts by weight per 100 parts of the block copolymer. As the proportion of fillers is increased beyond this amount, the peel strength and other physical properties achieved by the basic three-component composition begin to drop off so that the resulting composition if it contains excessive fillers will be nothing more than a masking tape which may exhibit temporary protection of the surface being covered but from which it may be readily withdrawn. Preferably no fillers are employed since maximum properties are obtained in the absence of fillers.

Another optional component in the adhesive compositions of this invention is a relatively low boiling (volatile) carrier which is preferably a liquid solvent capable of dissolving or at least colloidally dispersing all of the components of the adhesive other than any particulate fillers which may be present. The volatile liquid carrier may vary widely both in proportion and in components dependent upon the means of application of the adhesive and the requirements for fast or slow vaporization of the carrier so as to deposit a solid film of the adhesive on the desired surface. The specific nature of the solvent will vary with the particular components of the adhesive composition and do not form a critical limitation of the present invention. The volatility is controlled, for example, by the heat conditions contemplated for heat activating the adhesive if such conditions are required or may depend entirely upon normal vaporization rates at ambient room temperatures. Suitable solvents comprise aromatic, alicyclic and aliphatic hydrocarbons, ketones and the like and may comprise mixtures of the same. A particularly suitable solvent mixture comprises 30–85 parts by weight of an aromatic hydrocarbon such as toluene, xylene or benzene; 5–40 parts by weight of a ketone such as acetone or methyl ethyl ketone and 2–25 parts by weight of aliphatic hydrocarbon such as pentane, hexane or heptane. A specific solvent mixture which has been found to be especially suitable comprises about 70 parts by weight of toluene, 20 parts by weight of acetone and 10 parts by weight of normal hexane. The proportion of the solvent will depend upon the viscosity of the cement desired for the particular means of applying the solvent, e.g., by painting or by doctor blading the adhesive onto the surface to be so treated. Amounts of solvent up to about 300 parts by weight per 100 parts of the block copolymer are especially contemplated.

One of the primary purposes contemplated for the compositions of the present invention is in the formulation of heat activated cements. Preferred compositions for this special purpose include 100 parts by weight of the block copolymer, preferably having the configuration polystyrene-polybutadiene-polystyrene, 50–100 parts by weight of a coumarone-indene resin and 10–50 parts by weight of a polymerized rosin. It is preferred that the total content of the two types of resins present be 75–125 parts by weight for each 100 parts of the block copolymer. Furthermore, it is preferred that the coumarone-indene resins be present in an amount of 65–85 parts by weight and that the polymerized rosin be present in an amount of 15–40 parts by weight. Adhesives of this kind are especially useful for the cementing of shoe soles to shoe uppers particularly if the shoe sole comprises a substantial proportion of a block copolymer although this is not an essential feature. The adhesives are also suitable for the cementing of leather or natural rubber soles to uppers as well as for the cementing of vulcanized synthetic rubber shoe soling compositions. While the compositions are described as "heat activated" this is not necessarily essential for utilizing the adhesive since in many instances they may be employed simply by pressing together the two surfaces to be adhered, one of them having been previously coated with the adhesive composition. Alternatively, and in accordance with current practice in the shoe industry, the adhesive coated shoe component is activated by heating at a temperature below about 90° C. and preferably below about 75° C. for a time sufficient to increase the tack of the composition.

Another major use of the compositions of the present invention are so-called contact adhesives which have high self-tack while at the same time appear to be dry or non-tacky to the touch. They may be employed by simply pressing two surfaces together, one of which at least has been previously coated with the adhesive composition. Preferred adhesive compositions for this end use have the general formulation 100 parts by weight of a block copolymer preferably having the configuration polystyrene-polybutadiene-polystyrene, 25–50 parts by weight of a coumarone-indene resin and 25–50 parts by weight of an ester of a polyhydric alcohol and a hydrogenated rosin. It is preferred that the total resin content of the composition be between 65–85 parts by weight and still more preferred that each of the two types of resin be present in an amount between 32.5 and 42.5 parts by weight.

The following examples illustrate preferred aspects of the present invention:

Example I

Adhesive compositions were prepared, all of which contained 100 parts by weight of a block copolymer having the general configuration polystyrene-polybutadiene-polystyrene, the average block molecular weights being 14,000–64,000–14,000. The effects of resin content and of the ratio of two different resins in the adhesive compositions were determined, one of the resins being a coumarone-indene resin having a melting point of about 100° C., the other resin being a pentaerythritol ester of hydrogenated rosin. These resins, either in combination or singly, were combined with the block copolymer in the proportions indicated in Table IV below: The compositions were dissolved in a solvent system comprising three parts by weight of normal hexane, one part by weight of toluene and one part by weight of acetone to form solutions containing from about 25% to 40% by weight of elastomer and resin. The cements so formed were brushed on L-shaped metal strips one inch wide and five inches long and allowed to dry, i.e., for solvent to evaporate, for either 30 minutes or 60 minutes as indicated in Table IV. The cemented pairs of the strips, which were prepared by pressing two of the so-treated strips together and tapped lightly with a hammer after the open time indicated were then tested at room temperature in an Instron tester at a jaw separation speed of 0.5 inch per minute. It will be noted from the data contained in Table IV that the stress required for delamination under these conditions varied with the ratio of the two resins and that a sharply optimum ratio was equal parts of the two resins.

TABLE IV.—EFFECT OF RESIN, RESIN RATIO

| Sample | Coumarone-indene resin parts, w. | Rosin ester, parts, w. | Stress to delamination, lbs. | |
|---|---|---|---|---|
| | | | 30 min. open time | 60 min. open time |
| A | 75 | 0 | 50 | 70 |
| B | 50 | 25 | 50 | 70 |
| C | 37.5 | 37.5 | 90 | 97 |
| D | 25 | 50 | 20 | 50 |
| E | 0 | 75 | | 30 |

Table V indicates the results obtained by varying the total resin content relative to the block polymer. In these comparative tests equal proportions of the same two resins as described in Table IV were employed, the total resin content being varied from 25–100 parts by weight per 100 parts of the same block copolymer as utilized in the tests of Table IV. It will be noted from the data given in Table V, which were obtained in the same type of Instron test, that a optimum open time of about 90 minutes is indicated while an optimum total resin content of about 75 parts of resin per 100 parts of block copolymer appears to be proven.

TABLE V.—EFFECT OF RESIN, BLOCK COPOLYMER RATIO

| Sample | Parts total resin per 100 parts copolymer | Open time, Minutes | Stress to delamination, lbs. |
|---|---|---|---|
| A-1 | 75 | 15 | 90 |
| A-2 | 75 | 30 | 92 |
| A-3 | 75 | 90 | 100 |
| A-4 | 75 | 180 | 96 |
| B-1 | 100 | 15 | 44 |
| B-2 | 100 | 60 | 86 |
| B-3 | 100 | 90 | 78 |
| B-4 | 100 | 180 | 34 |
| C-1 | 50 | 15 | 62 |
| C-2 | 50 | 30 | 82 |
| C-3 | 50 | 90 | 72 |
| C-4 | 50 | 150 | 44 |
| D-1 | 25 | 15 | 48 |
| D-2 | 25 | 30 | 60 |
| D-3 | 25 | 90 | 48 |
| D-4 | 25 | 180 | 34 |

Example II

A heat activated adhesive was compounded comprising 100 parts by weight of the same block copolymer utilized in the adhesive described in Example I, 75 parts by weight of a coumarone-indene resin having a softening point of 50–60° C., and 25 parts by weight of a polymerized wood rosin. This composition was dissolved in a solvent having the same composition as that described in Example I to form a 35% cement. The cement was applied by either doctor blading operation or by brushing to shoe sole substrates and allowed to dry for 1–3 days at 20–50° C. Dry adhesive coatings were thus prepared which were from 3 to 7 mils in thickness. At the end of the drying period, the adhesive coated soling was exposed to infrared heat lamps to activate the adhesive after which two of the coated pieces were pressed together at about 175 pounds per square inch for about 15 seconds. The bonded pairs were then subjected to peel strength tests in the Instron Tester utilizing tests pieces one inch by six inches. It was found that highly satisfactory bonds were formed between two layers of commercial vulcanized rubber-resin soling; leather to vulcanized rubber-resin and block copolymer composition soling to vulcanized rubber-resin. The peel strengths obtained under these conditions were from about 35–50 p.l.i. The presence of the polymerized wood rosin in the adhesive formulation permitted the adhesive-coated pieces of soling to be exposed to air without material reduction in bond strength over substantially longer periods than if the resin derivative was omitted. Furthermore, the activation temperature dependance experienced with block copolymer adhesives containing only a single resin was not experienced when both resins were present.

Example III

The effect of bonding pressure and open drying time on peel strength was determined, utilizing the same adhesive composition described in Example II. An adhesive thickness of only 4 mils was used on all samples. The two surfaces adhered together were both high grade commercially available vulcanized SBR-styrene soling compounds. The following table gives the data obtained:

TABLE VI

| Drying time, hours | 4 | | 18 | | |
|---|---|---|---|---|---|
| Bonding pressure, p.s.i. | 175 | 30 | 175 | 100 | 66 |
| Peel strength, p.l.i. | 59 | 45 | 54 | 55 | 56 |

Example IV

An uncured soling composition comprising a block copolymer having the same structure as that used in the adhesive, polystyrene and an extending oil was bonded to a cured SBR-polystyrene commercial soling, using 6 mils of the same adhesive as in the previous examples. The open solings were coated with the adhesive, air-dried for 18 hours, heated to 63° C. and pressed 15 seconds at 175 p.s.i. The peel strength of specimens were determined after several sets of storage conditions:

Storage: Peel strength, p.l.i.
    Three days, vacuum, room temperature _____ 20
    Three days, air, 50° C. _____ 20
    Fourteen days, air, 50° C. _____ 21

We claim as our invention:
1. An adhesive composition which is non-tacky at ambient temperatures comprising:
  (a) 100 parts by weight of a block copolymer of the group consisting of copolymers having the general configuration

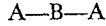

wherein each A is a polymer block of a monovinyl arene, said block having an average molecular weight between 8,000 and 45,000 and B is a polymer block of a conjugated diene, said block having an average molecular weight between 35,000 and 150,000 and hydrogenated derivatives of said block copolymers;
  (b) 25–100 parts by weight of a coumarone-indene resin;
  (c) 10–50 parts by weight of a rosin-based resin of the group consisting of rosin, polymerized rosin, hydrogenated rosin, rosin esters and mixtures thereof;
  (d) 0–25 parts by weight of a particulate filler; and
  (e) 0–50 parts by weight of a rubber extending oil.
2. An adhesive composition according to claim 1 comprising:
  (a) 100 parts by weight of a block copolymer having the general configuration, polystyrene-polybutadiene-polystyrene, the polystyrene blocks having an average molecular weight of 12,000–25,000, the polybutadiene block having an average molecular weight of 40,000–75,000, the polystyrene content of the copolymer being 20–35% by weight;
  (b) 50–100 parts by weight of a coumarone-indene resin;
  (c) 10–50 parts by weight of a polymerized rosin; and
  (d) 0–25 parts by weight of a particulate filler.
3. A composition according to claim 2 wherein the coumarone-indene resin is present in an amount of 60–85 parts by weight and the polmerized rosin is present in an amount of 15–40 parts by weight.
4. An adhesive composition according to claim 1 comprising:
  (a) 100 parts by weight of a block copolymer having the general configuration, polystyrene-polybutadiene-polystyrene, the polystyrene blocks having an average molecular weight of 12,000–25,000, the polybutadiene block having an average molecular weight of 40,000–75,000, the polystyrene content of the copolymer being 20–35% by weight;
  (b) 25–50 parts by weight of a coumarone-indene resin;
  (c) 25–50 parts by weight of an ester of a polyhydric alcohol and a hydrogenated rosin; and
  (d) 0–25 parts by weight of a particulate filler.
5. A composition according to claim 4 wherein the total content of resin and hydrogenated rosin ester is 65–85 parts by weight.
6. A composition according to claim 4 wherein the coumarone-indene resin and the hydrogenated rosin ester are each present in an amount of 32.5–42.5 parts by weight.

References Cited

UNITED STATES PATENTS 3,239,478   3/1966   Harlan _____ 260—27
3,325,430   6/1967   Grasley _____ 260—27

OTHER REFERENCES

Allied Chemical: "Cumar" 1948, pp. 8, 9, 15, 16, 32, 46, 48 and 49 relied on (copy in group 140).

DONALD E. CZAJA, *Primary Examiner.*

WILLIAM E. PARKER, *Assistant Examiner.*

U.S. Cl. X.R.

156—334; 161—226, 252